US 9,996,845 B2

(12) United States Patent
Zhang et al.

(10) Patent No.: US 9,996,845 B2
(45) Date of Patent: Jun. 12, 2018

(54) BIDDING ON USERS

(75) Inventors: Dong Zhang, Beijing (CN); Edward Y. Chang, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 867 days.

(21) Appl. No.: 12/715,956

(22) Filed: Mar. 2, 2010

(65) Prior Publication Data

US 2010/0228631 A1    Sep. 9, 2010

Related U.S. Application Data

(60) Provisional application No. 61/157,075, filed on Mar. 3, 2009.

(51) Int. Cl.
*G06Q 30/00* (2012.01)
*G06Q 30/02* (2012.01)

(52) U.S. Cl.
CPC ......... *G06Q 30/02* (2013.01); *G06Q 30/0269* (2013.01); *G06Q 30/0277* (2013.01)

(58) Field of Classification Search
CPC ................ G06Q 30/0269; G06Q 30/0277
USPC ............................. 705/14.66, 14.73
See application file for complete search history.

(56) References Cited

U.S. PATENT DOCUMENTS

| | | | |
|---|---|---|---|
| 5,918,014 A | 6/1999 | Robinson | |
| 8,244,599 B2 * | 8/2012 | Sundaresan | 705/27.1 |
| 2002/0029186 A1 | 3/2002 | Roth et al. | |
| 2005/0138139 A1 | 6/2005 | Jain et al. | |
| 2006/0042483 A1 * | 3/2006 | Work et al. | 101/91 |
| 2006/0085408 A1 | 4/2006 | Morsa | |
| 2008/0033776 A1 * | 2/2008 | Marchese | 705/14 |
| 2008/0103893 A1 * | 5/2008 | Nagarajan et al. | 705/14 |

(Continued)

FOREIGN PATENT DOCUMENTS

| | | |
|---|---|---|
| CN | 1816812 | 8/2006 |
| CN | 101192235 | 6/2008 |

(Continued)

OTHER PUBLICATIONS

User influence index—a new measure for Google to explore SNS profiting, http://zhengdeaini147.blog.163.com/blog/static/635681892008958560690, Oct. 5, 2008, 3 pages, abstract only.

(Continued)

*Primary Examiner* — Michael Bekerman
(74) *Attorney, Agent, or Firm* — Fish & Richardson P.C.

(57) ABSTRACT

In one implementation, a computer-implemented method includes receiving at a server a request from an advertiser to target an ad to users of a computer-implemented social network, the request comprising data representing characteristics of the users that the advertiser desires to target. The method further includes ranking the users based on how similar the users' characteristics are to the received characteristics and an influence score for each user that indicates how influential the user is within the social network. The method also includes scoring the advertiser's request based on a bid from the advertiser for an opportunity to display the ad to one or more of the users and assigning the opportunity to display the ad to the one or more users based on a correlation between a score of the advertiser's request and one or more rankings of the one or more users.

28 Claims, 8 Drawing Sheets

(56) References Cited

U.S. PATENT DOCUMENTS

| | | | |
|---|---|---|---|
| 2008/0147482 A1* | 6/2008 | Messing et al. | 705/10 |
| 2008/0162260 A1 | 7/2008 | Rohan et al. | |
| 2008/0235085 A1 | 9/2008 | Kovinsky et al. | |
| 2008/0243526 A1 | 10/2008 | Nance et al. | |
| 2008/0243607 A1 | 10/2008 | Rohan et al. | |
| 2008/0275861 A1* | 11/2008 | Baluja et al. | 707/5 |
| 2009/0018918 A1 | 1/2009 | Moneypenny et al. | |
| 2009/0132373 A1* | 5/2009 | Redlich | G06Q 30/02 705/14.39 |
| 2009/0164624 A1* | 6/2009 | Metcalf et al. | 709/224 |
| 2009/0177527 A1 | 7/2009 | Flake et al. | |
| 2009/0319359 A1* | 12/2009 | Soza et al. | 705/14.25 |
| 2010/0023394 A1 | 1/2010 | Yue et al. | |
| 2010/0145777 A1 | 6/2010 | Ghosh et al. | |
| 2010/0161662 A1* | 6/2010 | Jonas et al. | 707/780 |
| 2010/0299211 A1 | 11/2010 | Wu | |
| 2012/0095837 A1 | 4/2012 | Bharat et al. | |

FOREIGN PATENT DOCUMENTS

| | | |
|---|---|---|
| CN | 101313323 | 11/2008 |
| CN | 101350092 | 1/2009 |
| CN | 101360098 | 2/2009 |
| JP | 2001209683 | 8/2001 |
| JP | 2001-514772 | 9/2001 |
| JP | 2002007845 | 1/2002 |
| JP | 2002099866 | 4/2002 |
| JP | 2002288518 | 10/2002 |
| JP | 2003522437 | 7/2003 |
| JP | 2004171042 | 6/2004 |
| JP | 2006120135 | 5/2006 |
| JP | 2006-526853 | 11/2006 |
| JP | 2006330984 | 12/2006 |
| JP | 2007206876 | 8/2007 |
| JP | 2008-011544 | 1/2008 |
| JP | 2008009582 | 1/2008 |
| JP | 2008052495 | 3/2008 |
| JP | 2008-305258 | 12/2008 |
| JP | 2012519335 | 8/2012 |
| KR | 1020060105267 | 10/2006 |
| WO | WO 1998/34189 | 8/1998 |
| WO | WO200064165 | 10/2000 |
| WO | 2002082339 | 10/2002 |
| WO | WO 2004/111771 | 12/2004 |
| WO | WO 2006/110873 | 10/2006 |
| WO | WO 2006/135920 | 12/2006 |
| WO | 2008068716 | 6/2008 |
| WO | 2009002999 | 12/2008 |
| WO | 2009061616 | 5/2009 |
| WO | 2010099631 | 9/2010 |

OTHER PUBLICATIONS

Chinese Office Action in Chinese Application No. 200980158937.9, dated Jul. 24, 2014, 18 pages (with English translation).

Chinese Office Action in Chinese Application No. 200980158936.4, dated Jul. 24, 2014, 18 pages (with English translation).

Leskovec, "Dynamics of Real-world Networks" Thesis proposal. May 2, 2007, Machine Learning Department Carnegie Mellon University, 42 pages.

Notice of Acceptance issued in Australian Application No. 2009341524 dated Dec. 15, 2015, 2 pages.

International Search Report and Written Opinion in International Application No. PCT/CN2009/000223, dated Dec. 10, 2009, 10 pages.

Japanese Office Action in Japanese Application No. 2011-552295, dated May 28, 2013, 5 pages.

Ma, Hao et al., "Mining Social Networks Using Heat Diffusion Processes for Marketing Candidates Selection", Oct. 26-30, 2008.

Notice from the European Patent Office dated Oct. 1, 2007 concerning business methods, Official Journal of the European Patent Office, 30(11), Nov. 1, 2007 (Nov. 1, 2007), 592-593, XP007905525, ISSN: 0170-9291.

Chinese Office Action in Chinese Application No. 200980158937.9, dated Nov. 18, 2013, 16 pages.

European Search Report in European Application No. 09840965.9, dated Dec. 6, 2013, 6 pages.

Office Action issued in Canadian Application No. 2,754,121 dated Aug. 28, 2015, 3 pages.

Office Action issued in Korean Application No. 10-2011-7023197 dated Jul. 20, 2015, 13 pages (with English translation).

Office Action issued in Canadian Application No. 2,754,120 dated Jun. 4, 2015, 3 pages.

Office Action issued in Korean Application No. 10-2011-7023194 dated Jun. 19, 2015, 17 pages (with English translation).

Japanese Office Action in Japanese Application No. 2013-212748, dated May 26, 2014, 6 pages (with English translation).

Digital Advising Consortium Co. Ltd., Net Advertisement Handbook, Japan Management Association (JMA) Management Center Inc., Japan, Japan Management Association (JMA) Management Center Inc., Mar. 1, 2009, First Edition, 270 ~ 279 (no English translation available).

Japanese Office Action in Japanese Application No. 2013-207096, dated Jun. 9, 2014, 8 pages (with English translation).

Office action in Canadian Application No. 2754121, dated Nov. 2, 2016, 6 pages.

Australian Office Action in Application No. 2016201887, dated Mar. 7, 2017, 6 pages.

Office Action issued in Canadian Application No. 2754121, dated Jun. 12, 2017, 6 pages.

* cited by examiner

BIDDING ON USERS

CROSS-REFERENCE TO RELATED APPLICATIONS

This application claims priority to U.S. Provisional Patent Application Ser. No. 61/157,075 to Zhang et al., entitled "Bidding on Users" and filed Mar. 3, 2009, the contents of which are incorporated herein by reference.

TECHNICAL FIELD

This document generally describes methods and systems for placing advertisements on a social network.

BACKGROUND

The present disclosure generally relates to providing advertising to users of a social network. A social network may be an online system that provides a forum for users geographically separated to interact with one another. Social networks can be aimed at different aspects of social interaction, such as friendship and business networking.

Methods of advertising to users of a social network have included targeting the social network and users of the social network with specific content. In some methods, the entire social network has been targeted with advertisements directed to the general purpose of the social network (e.g., business). In other methods, specific users have been targeted with advertisements based upon the content of each user's profile page. For example, were a user to discuss sports on his/her profile page, an advertisement regarding sports may be targeted at the user.

SUMMARY

This document describes techniques for providing advertising to users of a social network. In general, a viewer's interactions with particular advertisements may be monitored, such as the advertisements the user skips, and the system may then select other advertisements that are determined to be more like advertisements the user has watched and less like those the user has skipped.

In one implementation, a computer-implemented method includes receiving at a server a request from an advertiser to target an ad to users of a computer-implemented social network, the request comprising data representing characteristics of the users that the advertiser desires to target. The method further includes ranking by the server the users based on how similar the users' characteristics are to the received characteristics and an influence score for each user that indicates how influential the user is within the computer-implemented social network. The method also includes scoring by the server the advertiser's request based on a bid from the advertiser for an opportunity to display the ad to one or more of the users targeted by the advertiser and assigning by the server the opportunity to display the ad to the one or more users targeted by the advertiser based on a correlation between a score of the advertiser's request and one or more rankings of the one or more users. The method further includes outputting by the server the ad for display on one or more clients associated with the one or more users assigned to the ad.

In another implementation, a system for assigning an opportunity to display an ad to users of a social network includes one or more servers and an interface to one or more of the servers to receive from an advertiser a request to target an ad to users of a social network, the request comprising data representing characteristics of the users that the advertiser desires to target. The system further includes means for ranking the users based on how similar the users' characteristics are to the received characteristics and an influence score for each user that indicates how influential the user is within the social network and a request scoring module installed on the one or more servers to score the advertiser's request based on a bid from the advertiser for an opportunity to display the ad to one or more of the users targeted by the advertiser. The system also includes an ad assignment module installed on one or more of the servers to: assign the opportunity to display the ad to the one or more users targeted by the advertiser based on a correlation between a score of the advertiser's request and one or more rankings of the one or more users, and output the ad for display on one or more clients associated with the one or more users assigned to the ad.

In another implementation, a computer-implemented method includes receiving at a server information related to a content of an ad from an advertiser and creating by the server an ordered list of users of a computer-implemented social network based on a likelihood a user will be receptive to the content of the ad and an amount of influence a user has over other users of the computer-implemented social network. The method further includes receiving at the server a bid from the advertiser for a right to display the ad to a user provided in the ordered list of users and awarding by the server the right to display the ad to the user to the advertiser if the bid from the advertiser is greater than other bids received within a time period from other advertisers for the right to display the ad to the user, wherein the bid from the advertiser is received within the time period. The method also includes outputting by the server the ad for display on a client associated with the user.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

This document generally describes a placement of advertisements on a social network. More specifically, the document describes an allocation of opportunities to display ads to users and a propagation of ads across the social network. In some instances, a method and system is described by which an advertiser can target ads to users of a social network according to a user's interests and influence on the social network. An opportunity to display an ad to an influential user with interests relevant to the ad may be more valuable to an advertiser than an opportunity to display an ad to a non-influential user with unrelated interests (or even a non-influential user with related interests). A user's influence on a social network may be determined by looking at the user's level of activity and/or acquaintance relationships on the social network. An advertiser may receive a ranked list of anonymous users according to user interest and influence. A bidding mechanism may be used to accommodate multiple advertisers seeking to obtain the opportunity to display ads to a finite number of relevant, influential users on a social network.

In some instances, once an opportunity to display an ad to a specific anonymous user has been awarded to an advertiser, an ad from the advertiser may be propagated from the user to the user's friends using a heat diffusion model. For instance, a user's influence on the social network can be represented as a heat intensity or a heat score, where users with more influence have a higher heat score. Propagation between users can then be modeled using a heat diffusion model. For example, an ad may spread (propagate) between two connected users as long as the user targeted with the ad has greater "heat" than the user yet to be targeted. This may result in ads propagating throughout the social network from more influential users to less influential users. One advantage that may be gained from the described method is the ability of advertisers to maximize advertising efficiency by propagating ads from influential users to influenced users.

Figure 1:
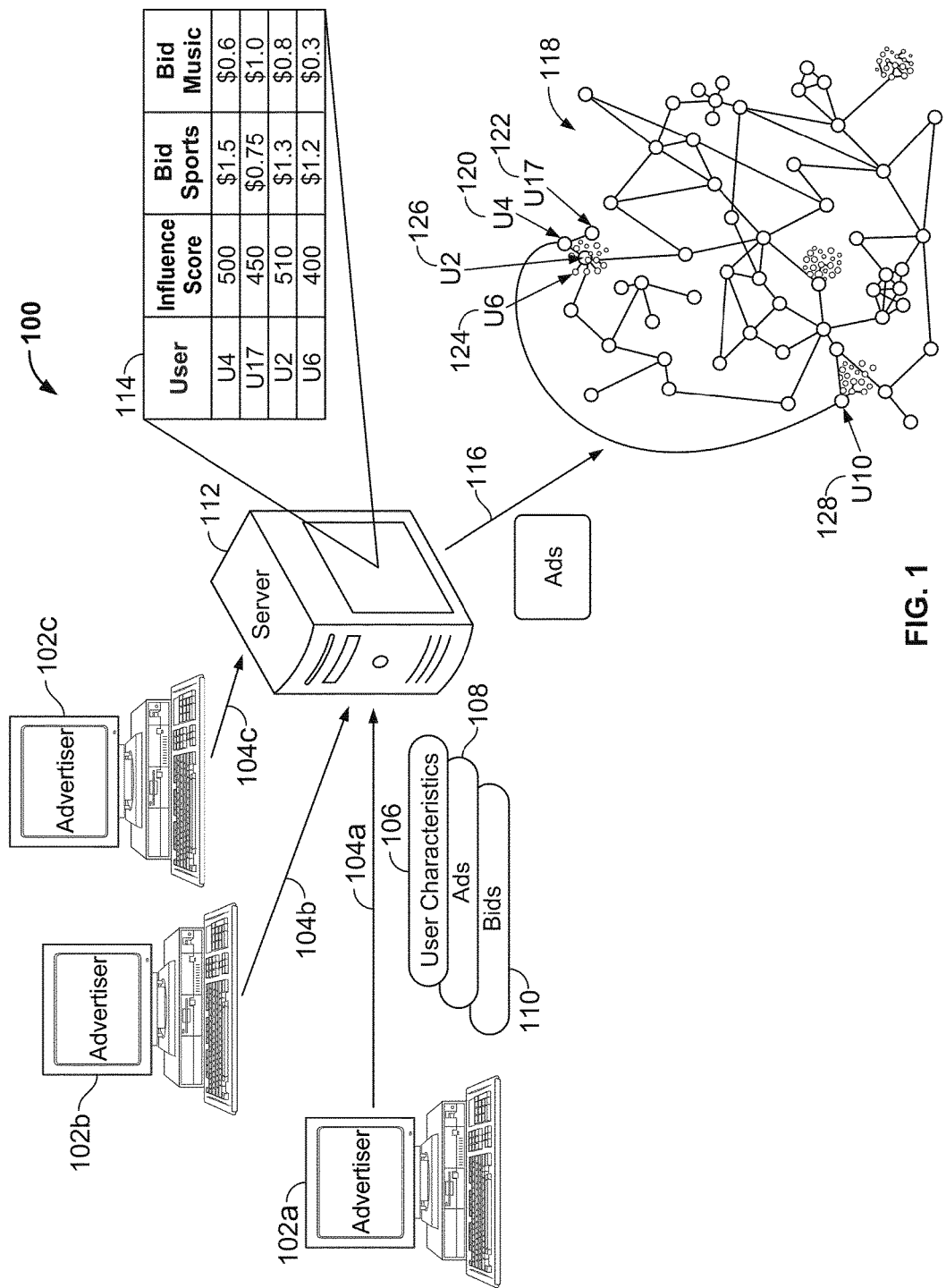
FIG. 1 is a diagram of an example system for receiving bids for opportunities to advertise to users of a social network and for propagating ads from user to user across a social network.

FIG. 1 is a diagram of an example system 100 for receiving bids for opportunities to advertise to users of a social network and for propagating ads from user to user across a social network. The system 100 can include advertisers 102a-102c, a server that receives bids 112, and a social network 118.

An advertiser 102a may submit a request to display an ad 108 to users of a social network having certain characteristics 106. The server 112 may receive the request and provide the advertiser 102a with a list of anonymized users ranked according to user influence score and/or user similarity to the requested characteristics 114. The advertiser 102a may then provide a bid for an opportunity to display the ad 108 to one or more of the ranked users 114. The server 112 may receive bids 104b and 104c from multiple advertisers 102b and 102c for the opportunity to display an ad to a certain anonymous user 114. For example, in bid chart 114 there are two bids ($1.50 for a sports ad and $0.60 for a music ad) for the opportunity to display an ad with user U4. The server 112 may then award the opportunity to display an ad to the highest bidder, at which point the ad 116 may be displayed on the social network 118.

The ad first may be displayed to the user that was anonymously bid upon (e.g., user U4 120). An ad 116 may then be propagated throughout the social network 118 along the connections between users. For instance, the ad may propagate from one user connected to another as long as the heat, or influence, score for the propagating user is greater than the heat score for the recipient user. For example, user U4 120 is connected to user U17 122. User U4 has a heat score of 500 and user U17 has a heat score of 450 114. An ad may propagate from user U4 120 to user U17 122 because the heat score of U4 is greater than U17. However, the ad may not propagate from user U4 120 to user U2 126 because the heat score of U2 is 510 and is greater than the heat score of user U4 114.

Figure 2:
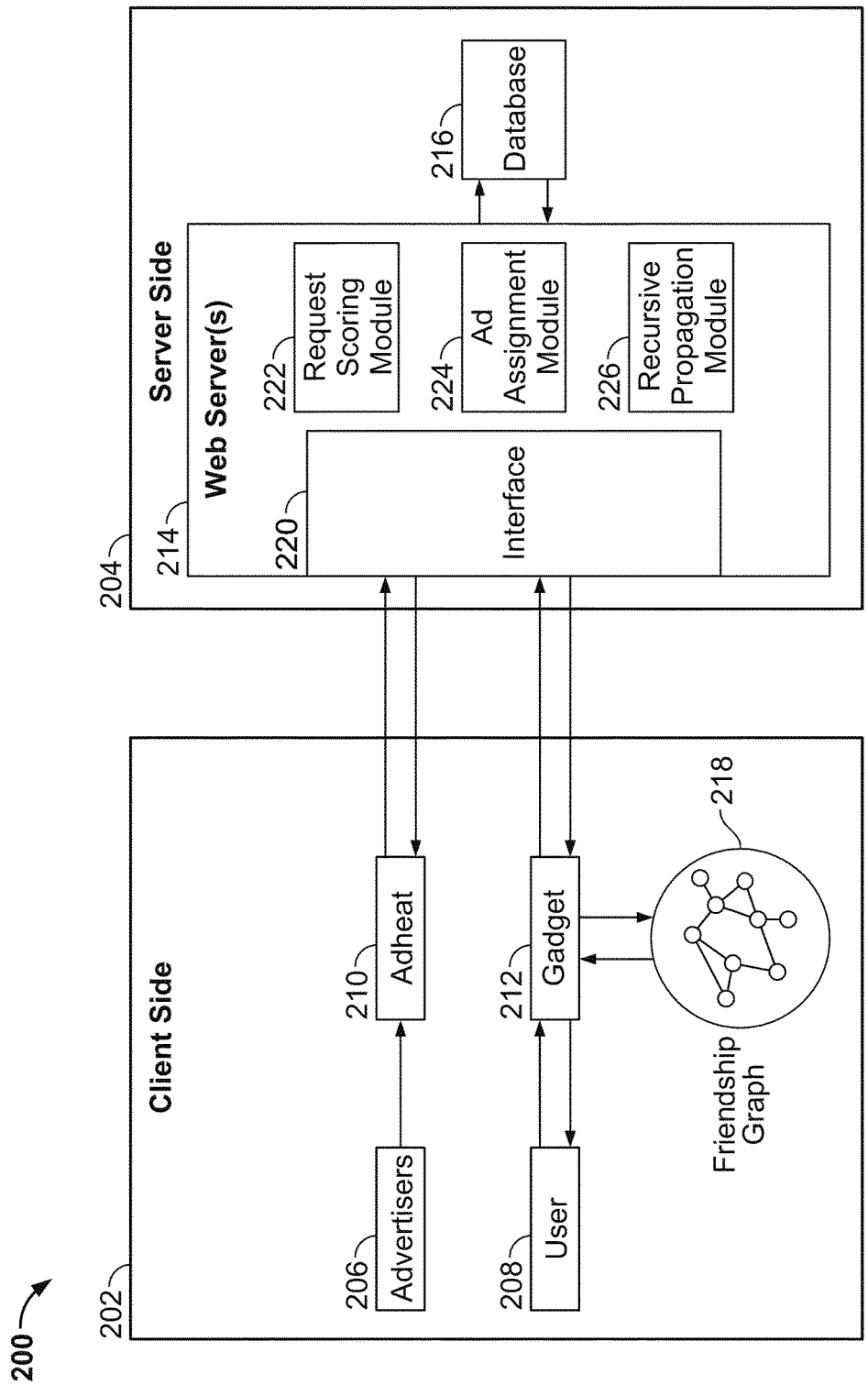
FIG. 2 is another diagram of an example system for receiving bids for opportunities to advertise to users of a social network and for propagating ads from user to user across a social network.

FIG. 2 is another diagram of an example system 200 for receiving bids for opportunities to advertise to users of a social network and for propagating ads from user to user across a social network. The system 200 may include a client side 202 and a server side 204. The client side 202 may interface with advertisers 206 to submit requests and bids to display advertisements to selected users of a social network. Additionally, the client side 202 can interface with users 208 to display the advertisements submitted by the advertisers 206 within, for example, pages viewed by the users on the social network. The server side 204 can receive advertiser 206 requests and award opportunities to display advertisements to selected users 208 through a bidding process. The server side 204 can also propagate advertisements, for example, using a heat diffusion model among users 208 of a social network connected by an acquaintance relationship (e.g., the users are designated as friends, the users visit each others' profiles, etc.).

The client side 202 can include an advertiser 206 that submits characteristics of users to which the advertiser 206 wishes to target ads. An advertising interface referred to here as the Adheat interface 210 can receive the characteristics and pass them to the server side 204. The server side 204 can include a webserver 214 that receives the characteristics and, through the use of a database 216, produces a list of users ranked by each user's influence on the social network and similarity to the characteristics submitted by the advertiser. After ranking, the webserver 214 can then pass the ranked list to the client side 202 in some implementations.

In some implementations, the webserver 214 may create an ordered list of users in response to receiving an ad and/or content of an ad from the advertiser 206. The ordered list may order the users according a likelihood a user will be receptive to the content of an ad and/or an amount of influence a user has over other users of a social network. Users listed near the top of the ordered list may be more likely to be receptive to the content of an ad and/or more influential over other users of a social network than users listed near the bottom of the ordered list.

The Adheat interface 210 at the client side can receive and provide the ranked list of users to the advertiser 206. The advertiser 206 can provide the Adheat interface 210 with bids for opportunities to display an ad to selected users on the ranked list. The Adheat interface 210, in turn, can pass the bids to the server side 204. After receiving the bids, the webserver 214 can run an auction and award opportunities to display ads to ranked users based upon the bids. The auction process is subsequently described in more detail.

The webserver 214 can transmit ads to the client side 202. A gadget 212 on the client side 202 can display to the users 208 ads provided by the advertisers 206 that won an opportunity to be displayed to the users 208. The ad can then be propagated through the social network, represented here using a friendship graph 218. This is described in more detail below.

As mentioned advertiser 206 may provide the Adheat module 210 with a request to target users of a social network with an ad. The request may include information specifying the ad's content and/or characteristics of the users the advertiser 206 desires to target with the ad. Characteristics of a user may include demographic information such as an age or age range, a gender, interests, an occupation, income, education, or geographic location of a user.

In some instances, the advertiser 206 may provide the Adheat module 210 with one or more keywords related to users whom the advertiser wishes to target. For example, the advertiser 206 may provide the Adheat module 210 with a request to display an ad related to "sports" to "male" users "between the ages of 18 and 35."

In some implementations, the advertiser 206 may select descriptors for the content of the ad and the characteristics of the users the advertiser 206 desires to target with the ad from a drop-down menu. For example, drop down boxes may offer advertisers a number of user characteristics from which to select. In some instances, the advertiser may provide the ad itself to the Adheat module 210 and the Adheat module 210 may analyze the ad and determine the content of the ad. An ad provided to the Adheat module 210 may be text, an image, a video, or any combination thereof.

The Adheat module 210 may determine the content of the ad using a content modeling method that derives the content of the ad based upon words and/or symbols used in and/or associated with the ad. In some instances, the content of the ad may be derived from the text of the ad. In instances where text or video is supplied with the ad, optical character recognition may be used to produce text for the ad. In some instances, the content of the ad may be derived from meta information associated with the ad.

The Adheat module 210 may submit the request from the advertiser 206 to the web server 214. In response, the web server 214 may provide the Adheat module 210 with a ranked list of anonymized users that match one or more of the characteristics specified by the advertiser 206.

An opportunity to display an ad to users ranked at the top of the list may be more valuable to the advertiser 206 than to users ranked at the bottom of the list. A user ranked at the top of the list may be more influential on a social network and may more closely fit the characteristics specified by the advertiser 206. The ranked list of users may include information for each user such as an anonymized user identifier (prevents an advertiser from identifying the particular user on the social network), an influence score, and a relevance score. The users may be ranked on the list according to the influence score, the relevance score, or a combination thereof. Generally, the greater a user's influence and relevance scores, the more likely the user may be presented at the top of the ranked list.

The influence score can be a metric of a user's influence with other users of a social network. The influence score may be based on a user's activity level and/or acquaintance relationships. A user's activity level can be a measure of a user's interactions on a social network.

An acquaintance relationship can be a connection between two users on a social network, such as a friendship. A user's influence score may be affected by a quantity and/or a significance of the user's acquaintance relationships.

For example, a user's activity level can be determined by the quality and/or quantity of the user's interactions with other users on a social network; the quality and/or quantity of content generated by the user on the social network; and/or the frequency of user interaction and/or content generation on the social network within a period of time. A user with a greater quality and/or quantity of interactions and/or content generated may be determined to have a greater activity level than a user with a lesser quality and/or quantity of interactions and/or content generated. Additionally, a user with a greater frequency of interactions and/or content generated within a period of time may be determined to have a greater activity level.

User interactions on a social network may at least include posting a comment on another user's page, sending a message to another user, participating in a forum on the social network, adding another user as a friend, posting a comment in a chat room on the social network, and/or viewing another user's profile page. Content generated by a user may at least include uploading an image or video, updating a user profile page, posting an entry to a blog, and/or updating user status information.

The quality of interactions for a user on a social network may be determined by evaluating the substantiveness of the interactions and/or the responsiveness of the interaction to the context within which it appears. For example, the following two comments regarding sports may be posted: 1) "I like sports" and 2) "I love to watch sports, especially football and hockey—check out the pictures I've posted in my profile from my Super Bowl party." The latter may be determined to have greater quality because it is more substantive.

Furthering the previous example, were either of the two comments to appear in response to a discussion regarding genres of music, they would likely not have a high level of quality because they are not responsive to the context (e.g., genres of music) within which they appear. A comment that is not highly substantive but which is responsive to the context within which it appears may be determined to have greater quality than a comment that is substantive but off-topic. For example, a comment posted in the discussion regarding music genres stating "The Blues are my favorite type of music," may be determined to have greater quality than the second, more substantive comment above.

Like the quality of user interactions, the quality of user generated content may be evaluated for substantiveness and responsiveness to context as well. In addition, the quality of user generated content may be evaluated based on originality. User generated content that is original (e.g., not previously posted on the social network by another user) may be determined to have a greater level of quality than content that is not original (e.g., copied from another user's profile page).

The quantity of a user's interactions and user generated content on a social network may be determined by a number of interactions and an amount of content posted on the social network. For example, a user posting five comments may be determined to have a greater quantity of activity than a user posting two comments.

In some instances, a user's activity level may be determined by a combination of the quality and quantity of user interactions and user generated content. The activity level may be determined by a weighted quantity of a user's interactions and/or a weighted quantity of content generated by the user, wherein each interaction and/or user generated content is weighted according to its quality. For example, a user posting two comments similar to comment 2 (above) may have a greater activity level than a user posting five comments similar to comment 1 (above).

Additionally, a user's activity level may be based, at least in part, on a frequency of interactions and/or content generated by the user within a period of time. For example, a user that interacted with five other users and posted ten new pictures (e.g., content generation) in the last month may be determined to have a greater activity level than another user that interacted with only two other users and posted only five new pictures in the past month. Interactions and/or content generated may additionally be weighted according to a determined quality.

A user's influence score may be affected by a quantity of the user's acquaintance relationships. A user with more friends may be more influential than a user with fewer friends. As such, a user with a greater number of acquaintance relationships may produce a greater influence score than a user with a lesser number of acquaintance relationships.

A user's influence score may be affected by a significance of the user's acquaintance relationships. A user with more significant acquaintance relationships can have greater influence on a social network than a user with less significant acquaintance relationships. The significance of a user's acquaintance relationship can be based on an influence score of the user's friend (a user connected to the user by the acquaintance relationship) and/or whether the acquaintance relationship connects separate sub-graphs of a social network.

In some instances, a user's acquaintance relationship with a user having a greater influence score may be more significant than an acquaintance relationship with a user having a smaller influence score. In other instances, a user's acquaintance relationship with a user having a smaller influence score may be more significant than an acquaintance relationship with a user having a greater influence score.

A social network of users can be represented as a graph of users (nodes) connected to each other by acquaintance relationships (edges), as exemplified by a friendship graph 218. Acquaintance relationships can be explicit relationships among users of a social network. For instance, a mutually agreed-upon friend designation among two users can be explicit. Acquaintance relationships can also be implicit. For example, even though users U3 and U4 do not have an explicit friendship relationship, an acquaintance relationship may implicitly exist between them if user U3 visits user U4 profile page, user U3 interacts with user U4 via an interface on the social network (e.g., a chat room, email exchange, etc.), and/or user U3 and user U4 share a friend in common (e.g., they both have an explicit friendship relationship with user U5).

Within a social network graph, a sub-graph can be a group of users that have many acquaintance relationships with each other but few acquaintance relationships with users outside of the group. An acquaintance relationship connecting users of two separate sub-graphs may be more significant than an acquaintance relationship connecting users within the same sub-graph. For example, users U2, U4, U6, and U17 in social network 118 are connected via acquaintance relationships within the same sub-graph. A connection between user U4 and user U10, which is part of a sub-graph separate from U4's sub-graph, can be deemed to connect users of separate sub-graphs.

The relevance score may be a metric of the similarity between a user's characteristics and the user characteristics an advertiser 206 has requested to target with an ad. As previously described in regard to an advertiser 206 request, characteristics of a user may include demographic information such as an age or age range, a gender, interests, an occupation, income, education, or geographic location of a user. A user with characteristics similar to the characteristics requested by an advertiser 206 may have a greater relevance score than a user with less similar characteristics. For example, assume users U3 is "male, age 25, likes hockey" and user U5 is "male, age 37, likes blues music." For an advertiser request to display an ad to "male" users "between the ages of 18 and 35" that like "sports," user U3 will have a greater relevance score for the request than user U5.

In some instances, the user activity level score may be determined in view of the relevance of each interaction to an advertiser's 206 request. In such an instance, each interaction may be weighted according to its relevance to the characteristics requested by an advertiser 206. For example, using the scenario from the previous paragraph, if users U3 and U5 post the same number of substantive comments on a social network but more of user U5's posts relate to sports, user U5 will have a greater weighted activity level score than user U3.

In some embodiments, the web server 214 may receive the ranked list of users by querying a database 216 hosted on the server side 204. The database 216 may include anonymized information related to users of a social network. For example, the anonymized information may include information related to a user's characteristics, interactions on a social network, influence on a social network, and/or relevance to an advertiser 206 request.

In some instances, the database 216 may be populated with models related to users of a social network. The models may provide a synopsis of user characteristics, including interests, in a format that is maintained and queried. The models may generate information for insertion into the database 216 by the web server 214, or another server side 204 component not shown. For example, latent topic modeling may be used to generate the models. Latent topic modeling can produce models by processing data from a social network (e.g., user profile page, user interactions) to derive a user characteristics (e.g., interests).

Upon receiving a ranked list of users from a web server 214, the Adheat module 210 may provide the ranked list of users to the advertiser 206. In turn, the advertiser 206 may provide the Adheat module 210 with a bid for an opportunity to display an ad to one or more users included in the ranked list of users. The bid may specify the minimum bid per user, the maximum bid per user, and/or the total budget for propagating the ad across a social network. The advertiser 206 may bid upon individual ranked users and/or blocks of users in the ranked list.

An opportunity to display an ad to users ranked higher on the ranked list may be more expensive than an opportunity to display an ad to a lower ranked user. This may occur if the user ranked at the top of the list is highly influential on a social network and relevant to the characteristics submitted by the advertiser 206 with regard to the ad. An advertiser 206 desiring to win the opportunity to display an ad to a user ranked at the top of the list will likely have to place a higher bid for that user than for lower ranked users because other advertisers are likely to bid on the same influential user.

In some implementations, the Adheat module 210 may perform some or all of the functions that are performed by the web server 214 regarding ranking users of a social network. For example, in response to receiving an advertising request from the advertiser 206, the Adheat module 210 may send a request for a list of users to the web server 214 without sending information regarding content of the advertiser's 206 ad. In response, the web server 214 may provide the Adheat module 210 with a list of users and their associated information (e.g., user influence score, user interests). The Adheat module 210 may then compute a ranking for the users based on the received users' influence scores and/or a similarity between the received users' interests and the content of the ad. After computing a ranked list, the Adheat module 210 can display the ranked list to the advertiser 206 and receive user bids from the advertiser 206.

In such implementations, the Adheat module 210 may request from the web server 214 users falling within a certain influence score range or influence score percentile. For example, the Adheat module 210 may request that the web server 214 return users having an influence score greater than 450. In another example, the Adheat module 210 may request that the web server 214 return users having influence scores within the top 10% of influence scores. The Adheat module 210 may then rank these users, as previously described.

The Adheat module 210 may submit the bid from the advertiser 206 to the web server 214. The web server 214 may receive bids for the opportunity to display ads to users of a social network from a plurality of advertisers 206 through a plurality of Adheat modules 210 (see e.g., 104a-c in FIG. 1). The web server 214 may run an auction for the opportunity to display ads to users of a social network based upon the bids received from the advertisers 206. The auction may award the opportunity to display an ad to a user of a social network to the advertiser with the highest bid.

For example, advertiser A1 may have submitted a maximum bid of $1.50 for the opportunity to display an ad related to sports to anonymous user U1. Advertiser A2 may have submitted a maximum bid of $1.00 for the same opportunity to display an ad to user U1, but advertiser A2's ad may be related to music. The auction run by the web server 214 would award the opportunity to display an ad to user U1 to advertiser A1 because its maximum bid is greater.

The web server 214 may propagate an ad to a gadget 212 associated with a user 208 after an auction has awarded the opportunity to display an ad to the user. In some instances, the gadget 212 is an interface that displays ads on a page viewed by the users on the social network. The ad of the advertiser 206 that won the auction may be transmitted to the gadget 212 (the gadget 212 may display an ad to the user 208 through a computer display). The gadget 212 may provide the user with an interface allowing the user to interact with the ad. The gadget 212 may be a simple HTML or JavaScript application that can be embedded in a webpage or other application. In some instances, user interaction with an ad may include the user selecting whether to propagate the ad to other users connected to the user by acquaintance relationships.

In some instances, a user that interacts with an ad may share in profits of the advertisement. In some implementations, the profit shared with a user may be a percentage of the profits attributable to the user's interaction, a fixed amount, an amount based upon a number users that view and/or interact with the ad attributable to the user's interaction, and/or an amount based upon characteristics and/or influence of the users that view and/or interact with the ad attributable to the user's interaction. For example, a user that interacts with an ad by deciding to propagate the ad to other users of a social network may receive a share of profits for the ad based upon the number of users to which the ad is propagated.

In some implementations, propagation of an ad is attributable to a user only if the user directly propagates the ad via one of its acquaintance relationships. In other implementations, propagation of an ad is attributable to a user if it is possible to trace back to the user's interaction in a chain of propagations of the ad from user to user. In such an implementation, profits attributable to the propagating user may decrease as the user's propagation becomes more distant. For example, user U1 may receive 10% of the profits for propagating an ad to user U2. However, when user U2 propagates the ad to user U3, user U1 may receive only 5% of the profits. Similarly, when user U3 propagates the ad to user U4, user U1 may receive only 2.5% of the profits.

The gadget 212 may propagate the ad to other users of the social network based upon a heat diffusion model. Heat diffusion is a concept from thermodynamic physics. In general terms, it provides that heat spreads (diffuses) from one adjacent particle to another when there is a difference in heat between the two particles. For example, if particles A and B are adjacent and they have temperatures of 70 and 50 degrees, respectively, heat will travel from particle A to particle B. However, heat will not travel from particle B to particle A. If both particles A and B have temperatures of 70 degrees, no heat transfer will occur.

Using the heat diffusion model ads are propagated across a social network by assigning each user a "temperature." An ad is transmitted from a propagating user to a receiving user as long as the propagating user has a higher "temperature" than the receiving user. In some implementations, the heat diffusion model represents a user's temperature using a heat index score. A user's heat index score can be based upon a user's influence score (described above) on a social network. A user's heat index score and influence score may have a direct relationship (e.g., a more influential user will have a greater heat index score).

Under a heat diffusion model framework, an ad can propagate between "adjacent" users. Two users may be considered to be adjacent if they are connected to each other on a social network, as represented by the connections between nodes on the friendship graph 218. A connection between users may take the form of an acquaintance relationship. An acquaintance relationship can be, among other things, a relationship signifying the users are friends, colleagues, classmates, and/or members of the same group. In other implementations, an acquaintance relationship can indicate that the users have viewed each others profiles, posted content to a profile pate for a user, and/or received an electronic communication (e.g., a chat request from another user).

In some implementations, an ad propagates from a propagating user to all users connected to the propagating user with a lower heat index score than the propagating user. For example, user U3 is a propagating user with a heat index score of 70. User U3 is connected to users U5, U8, and U9, which have heat index scores of 50, 35, and 80, respectively. An ad displayed to propagating user U3 will spread to users U5 and U8 because they have lower heat index scores. The ad will not propagate to user U9 because user U9 has a greater heat index score than propagating user U3. However, when an ad is displayed to user U9 and it is serving the role as propagating user, the displayed to user U9 ad will propagate to user U3 because user U3 has a lower heat index score.

Under the heat diffusion model, an ad propagates across users a social network using recursion. An ad is spread from a propagating user to recipient users, wherein each recipient user is connected to the propagating user and has a lower heat index score than the propagating user. After being displayed the ad, each recipient user may act as a propagating user. As such, the ad is spread from a recipient user to other users connected to the recipient user having a heat index score lower than the recipient user.

For example, using the above scenario, assume user U9 starts as a propagating user. The ad is displayed to user U9 and then propagated to its connected users having a lower heat index score. In this case, the ad is propagated to user U3 because user U3 has a lower heat index score than user U9. User U3 then serves as a propagating user. With user U3 as the propagating user, the ad is then propagated to users U5 and U8 because users U5 and U8 have lower heat index scores than user U3. Users U5 and U8 will then serve as propagating users. The ad will be propagated to users connected to user U5 having a lower heat index score than user U5. The ad will also be propagated to users connected to user U8 having a lower heat index score than user U8.

The recursive propagation of an ad can continue until an end condition is met. In some instances, the end condition may be the end of a budget for the ad having been exhausted. In other instances, the end condition may be the propagating user electing to not interact with the ad. In such an instance, the gadget 212 may replace the ad with a substitute ad for display to the user 208. In other instances, the end condition may be the heat index score of the recipient user being greater than the heat index score of the propagating user. In other instances, the end condition may be the recipient user already having received the ad.

The gadget 212 may transmit data regarding user 208 interaction with the ad to the web server 214. The transmitted data may include information related to advertisement views and clicks.

The webserver 214 may be comprised of one or more servers. The webserver 214 may include an interface 220, a request scoring module 222, an ad assignment module 224, and a recursive propagation module 226. The interface 220 may be capable of communicating with the client side 202. The request scoring module 222 may score a bid received from the advertiser 206 for an opportunity to display an ad to at least one user of a social network. The ad assignment module 224 may assign an opportunity to display an ad to a user of a social network based upon bids scored by the request scoring module 222. The recursive propagation module 226 may recursively propagate an ad to users of a social network based upon user influence scores.

Figure 3:
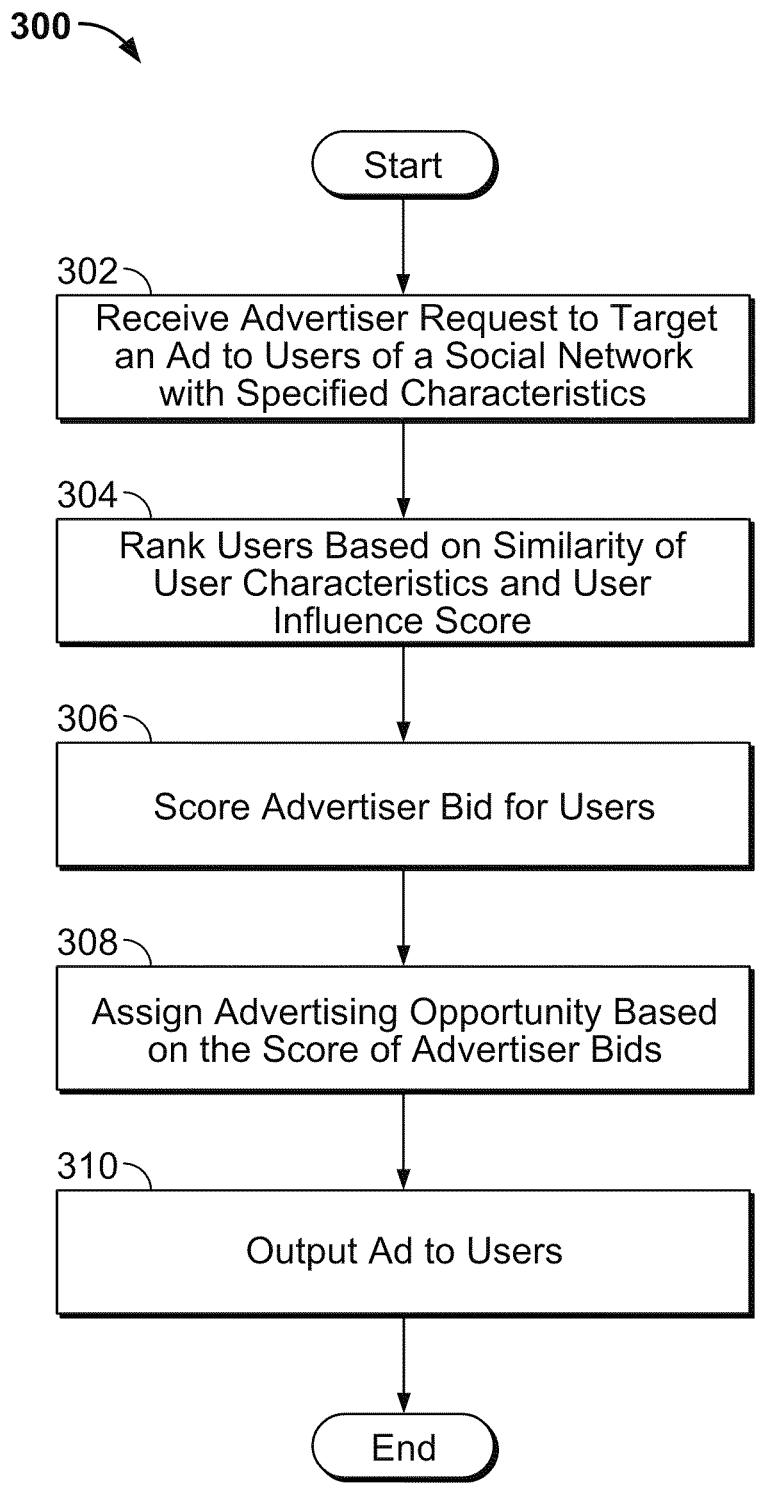
FIG. 3 is a flow chart of example process for awarding an opportunity to display an ad to users of a social network based upon advertiser requests.

FIG. 3 is a flow chart of example process 300 for awarding an opportunity to display an ad to users of a social network based upon advertiser requests. The processes 300 may be performed, for example, by a system such as the systems 100 and 200 and, for clarity of presentation, the description that follows uses the systems 100 and 200 as the basis of an example for describing the processes. However, another system, or combination of systems, may be used to perform the process 300.

Process 300 may start at step 302 by receiving an advertiser's request to target an ad to users of a social network with specified characteristics. The advertiser's request may be received on a server side from a client side. For example, web server 214 may receive a request from advertiser 206 on client side 202.

At step 304, process 300 may rank users of a social network based on similarity of user characteristics to the specified characteristics and a user influence score. Ranking users may be performed in response to a request received from an advertiser. For example, the web server 214 may sort users based on profiled information and information submitted by the advertiser 206 that specifies characteristics of users the advertiser wishes to target. In some implementations, the web server 214 may presort, or rank, users based on influence. For example, the users' influence ranking may be updated on a period basis (e.g., hourly). Then when users are ranked according to advertiser submitted characteristics, the pre-calculated ranks for influence can be combined with the characteristic rankings to produce a user ranking based upon user influence and characteristics.

In some embodiments, process 300 may also include sending the ranked list of users to the advertiser that provided the request. Some embodiments may also include receiving an advertiser bid for an opportunity to display an ad to users on the ranked list. An advertiser bid may include a bid for an opportunity to display an ad to an individual user and/or a bid for an opportunity to display an ad to a group of users. For example, an advertiser may bid $1.00 for an opportunity to display an ad to user U3 and $2.50 for an opportunity to display an ad to users U4-U8.

In some implementations, the group of users may be a range of the ranked users. For example, an advertiser may bid on an opportunity to display an ad to users that are ranked from 1-10 on the ranked list. In some implementations, an amount bid on a group of users may correspond to an amount for all of the users within the group (e.g., $1.00 for all users U4-U8). In other implementations, an amount bid on a group of users may correspond to an amount for each user within the group (e.g., $1.00 for each user U4-U8).

Process 300 can score advertiser bids for an opportunity to display an ad to users of a social network at step 306. For example, scoring can be based upon an amount bid by an advertiser for an opportunity to display an ad to a user of a social network. There may be a direct relationship between a resulting score and an amount bid (e.g., the greater the bid, the greater the resulting score).

The bids may also be scored based on how relevant users have found the advertisers' ads in the past. For example, a database at the server side 204 may store information indicating a historical click-through rate for ads submitted by particular advertisers. Bids from advertisers having ads with higher click-through rates may be scored higher than bids from advertisers that have ads with lower click-through rates.

In some implementations, an advertiser bid for an opportunity to display an ad to a group of users may be provided one score. In some implementations, an advertiser bid for an opportunity to display an ad to a group of users may be provided a score for each individual user of the group. In some embodiments, a score for an individual user of the group may be equal scores for the other users of the group (e.g., score for individual user=score for group of users/ number of users). In other embodiments, a score for an individual user of the group may be a share of a score for the group proportionate to the user's influence score in relation to the influence scores for the other users (e.g., score for individual user=score for group of users×(influence score for individual user/aggregate influence score for group)).

At step 308, an advertising opportunity can be assigned to an advertiser. Assigning the advertising opportunity may be based on the score of advertiser bids and/or the score associated with the users to which the ad will be displayed. An advertiser may be assigned an advertising opportunity for an individual user and/or for a group of users. Bids considered when assigning an advertising opportunity may be limited to bids received within a specified timeframe and/or bids for displaying an ad to a user within a specific date range.

In some implementations where an advertiser submits a group bid and the group bid is scored for each user within the group, an opportunity to display an ad to the group may be assigned to the advertiser if, for each user within the group, a corresponding bid score is greater than bid scores from other advertisers. For example, if an advertiser bids to display an ad to users U4-U8 and the bid is scored for each user individually (e.g., 1.0 score for each user), an opportunity to display an ad to the group may be awarded to the advertiser so long as no other advertiser has a bid score greater than (or less than, depending on the scoring technique) 1.0 for any of the users U4-U8.

In some other implementations where an advertiser submits a group bid and the group bid is scored for each user within the group, an opportunity to display an ad to each user within the group may be evaluated and assigned for each user individually. For example, if an advertiser bids to display an ad to users U4-U8 and the bid is scored for each user individually (e.g., 1.0 score for each user), an opportunity to display an ad to user U4 may be assigned to the advertiser so long as no other advertiser has a bid score of greater than 1.0 for user U4. The opportunities to display an ad to users U5-U8 may be assigned in a similar manner, independent of the evaluation and assignment of opportunities to display ads to other users within the group.

In some implementations where an advertiser submits a group bid and the group bid is provided a group score, an opportunity to display to the group may be assigned to the advertiser with the greatest scored bid for the group. For example, if a first and a second advertiser have bid scores of 2.5 and 2.7 for an opportunity to display an ad to users U4-U8, the second advertiser may be assigned the opportunity to display the ad to users U4-U8.

In some implementations where an advertiser submits a group bid and the group bid is provided a group score, the opportunity may be assigned by determining the minimum score required to display the ad to each individual user, aggregating the minimum scores for the group, and assigning the opportunity to the advertiser if the aggregated minimum score is less than or equal to the group bid score. For example, if an advertiser's bid score for a group of users U4-U8 is 2.5 and an aggregate minimum score for displaying the ad to the group is 2.4 (e.g., a minimum score for displaying an ad to each of the users U4-U8 may be 1.0, 0.8, 0.2, 0.2, and 0.2, respectively), the advertiser may be assigned the opportunity to display to the group. A minimum score to required to display an ad to a user may be determined by ascertaining the greatest bid score for the user and incrementing the greatest bid score by a predetermined amount and/or percentage.

In some implementations, there may exist more than one opportunity to display an ad to a user within a time period. These opportunities may be assigned to the same or different advertisers depending on the bid scores. For example, if there are three opportunities to display an ad to a user within a time period, bids with the three greatest scores may be assigned the three opportunities. For instance, if four advertisers (A1-A4) bid on opportunities to display ads to four users (U1-U5) and there are three opportunities available per user, advertisers with first through third place bids for a user will be awarded an opportunity to display an ad to the user. If A1 bids $2.00 for users U1-U4, A2 bids $1.50 for users U1-U3, A3 bids $1.00 for users U2-U4, and A4 bids $0.50 for users U1-U4, then advertising opportunities may be assigned for each user as follows: U1-A1, A2, A4; U2-A1, A2, A3; U3-A1, A2, A3; U4-A1, A3, A4; U5—no opportunities assigned.

In some implementations, when multiple opportunities to display an ad to a user exist, a single advertiser may be assigned more than one of the multiple opportunities if the single advertiser provided a bid for more than one of the multiple opportunities.

After assigning an advertising opportunity for a user or users to an advertiser, the advertiser's ad can be output to the user or users at block 310. The user or users receiving the ad can be on a client side, such as the users specified in social network 118 or user 208.

In some implementations, users of a social network for which an advertising opportunity was not assigned, such as user U5 in the preceding example, may receive default ads in place of ads assigned to an advertiser (e.g., default ads may include ads for the social network, profiles of other users on the social network, ads for non-profit/charitable organizations, etc.).

Figure 4:
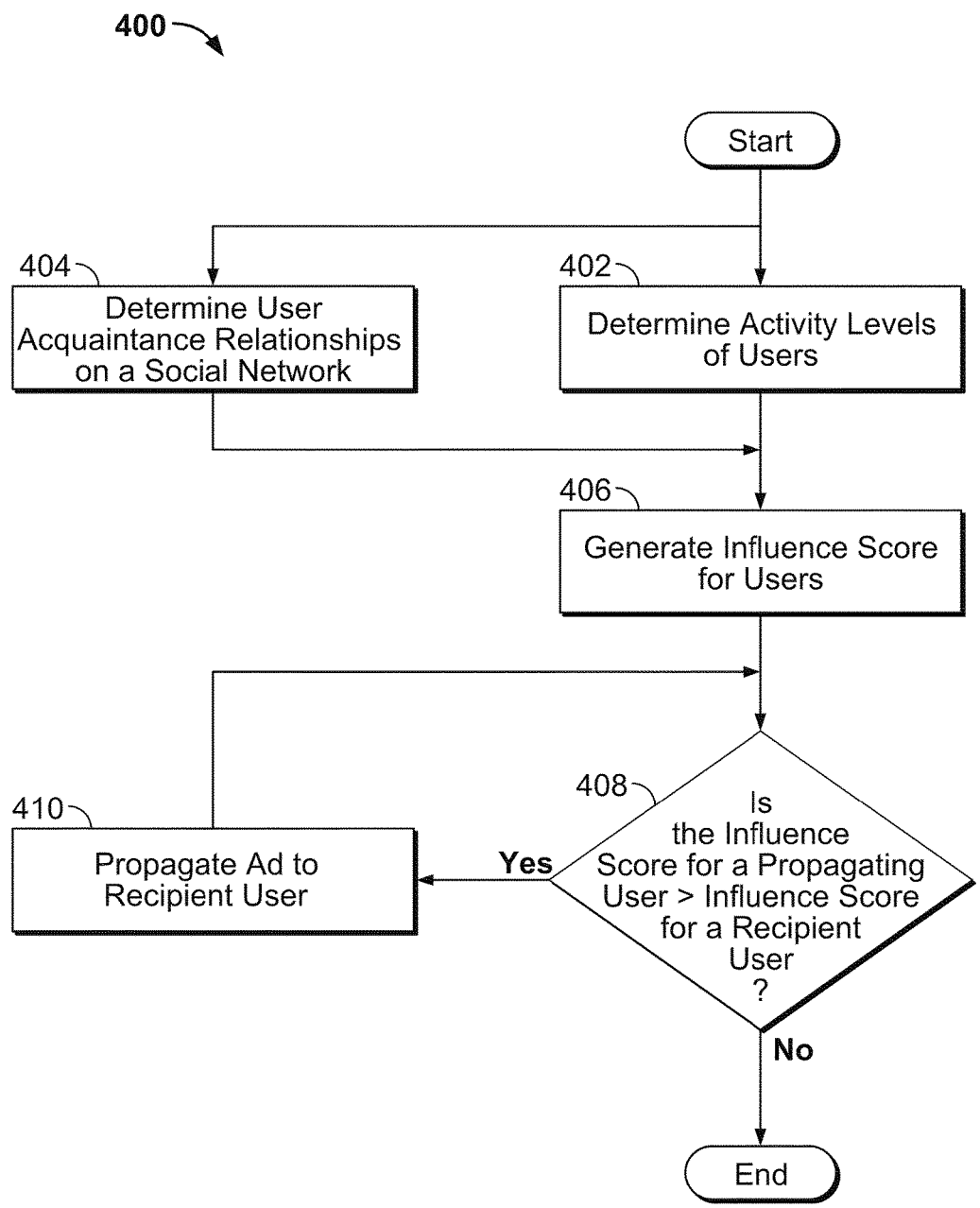
FIG. 4 is a flow chart of example process, respectively, for recursively propagating an ad across users of a social network.

FIG. 4 is a flow chart of example process 400, respectively, for recursively propagating an ad across users of a social network. The processes 400 may be performed, for example, by a system such as the systems 100 and 200 and, for clarity of presentation, the description that follows uses the systems 100 and 200 as the basis of an example for describing the processes. However, another system, or combination of systems, may be used to perform the process 400.

Process 400 may begin at steps 402 and/or 404. At step 402, process 400 can determine acquaintance relationships (e.g., friendship) among users of a social network. At step 404, process 400 can determine activity levels (e.g., number of posts, friend adds, etc.) for the users of a social network.

At step 406, process 400 may generate an influence score for the users of a social network using the determined user acquaintance relationships and the determined user activity levels. Combining a user's acquaintance relationships and activity level to generate an influence score may be performed differently depending on configurations of the social network and/or advertiser preferences. For example, a first social network may be configured to weight acquaintance relationships twice as heavily as activity level while a second social network may be configured to weight acquaintance relationships and activity level equally.

In some implementations, a social network may have multiple configurations that are used to generate an influence score for users of the social network. The social network determination of which one of the multiple configurations to use may depend on conditions within the social network and/or a type of ad to be displayed. For example, a configuration used by the social network during a weekday may be different from a configuration used during a weekend. Different configurations may be determined by a social network based upon demographic information of users accessing the social network during various time periods.

In some implementations, a social network may defer to an advertiser's weighting of acquaintance relationships and activity level when generating influence scores for users of a social network. Use of influence scores generated by deferring to an advertiser's weighting may be limited to ads from the advertiser. An advertiser may provide a social network with weightings that apply to specific ads from the advertiser.

Generation of influence scores for users of a social network at step 406 may be performed at regular intervals and/or at the occurrence of certain events. For example, influence scores may be generated every ten minutes, half-hour, hour, six hours, twelve hours, day, 3 days, week, and/or month. As another example, influence scores may be generated when a certain number of activity events within the social network have occurred (e.g., generate influence score every time: 1000 comments are posted on the social network, 10 users join the social network, 100 acquaintance relationships are formed, etc.).

In some implementations, generation of an influence scores for users of a social network at step 406 may be triggered by the display of an ad to a user of a social network. For example, every time an ad is to be displayed on a social network to a user for the first time, the social network may generate influence scores for users of the social network. When generation is triggered by an ad, the generation of influence scores may be limited to users within a sub-graph of a user to be initially targeted with the ad.

In some implementations, process 400 may display an ad to a user of a social network. An opportunity to display the ad to the user may have been awarded to an advertiser that won the opportunity through a bidding process, as outline, for example, with reference to FIG. 3.

At step 408, process 400 may determine whether an influence score for a propagating user is greater than an influence score for a recipient user. The propagating user may be a user to whom an ad is displayed. The recipient user may be a user connected to the propagating user via an acquaintance relationship (e.g., friendship). If the influence score for the propagating user is greater than the influence score for a recipient user, process 400 may propagate the ad from the propagating user to the recipient user at step 410.

In some instances, steps 402-406 regarding generation of influence scores may not be performed until step 408. In such an instance, steps 402-406 may only be performed for the propagating user and the recipient user. For example, after an ad is displayed to a propagating user process 400 may determine the influence scores for the propagating and recipient users.

At step 410, propagating an ad from a propagating user to a recipient user may involve displaying an ad to the recipient user. The ad displayed to the recipient user may be the same ad displayed to the propagating user. After propagating the ad to the recipient user at step 410, process 400 may return to step 408. However, when returning to step 408, the recipient user may serve as a propagating user and a user connected to the recipient user via an acquaintance relationship may serve as a recipient user.

For example, if user U1 is initially a propagating user and user U2 is initially a recipient user and U1's influence score is greater than U2's, then an ad displayed to U1 may propagate to U2. After the ad is propagated to U2, process 400 may return to step 408 with U2 serving as a propagating user and user U3, connected to U2 via an acquaintance relationship, serving as a recipient user.

An ad may recursively propagate among users of a social network at steps 408 and 410. Steps 408 and 410 may be performed for each acquaintance relationship of a propagating user. For example, an ad displayed to the propagating user may be propagated to each the propagating user's acquaintance relationships with an influence score less than the propagating user's. Subsequently, each user receiving the ad from the propagating user may propagate the ad to each of its acquaintance relationships having a lesser influence score.

Recursive propagation of an ad at steps 408 and 410 may continue until process 400 determine an influence score for a propagating user is not greater than an influence score for a recipient user. When such a determination is made, process 400 may end. Recursive propagation may also end when a condition is met that does not permit the continued propagation of the ad (e.g., conditions outlined with regard to FIG. 7).

In some instances, propagation using a heat diffusion model can be limited based on a degree of separation between the users. For example, if the ad has propagated to a user greater than 6 degrees of separation from the originating user, the propagation may stop regardless of the heat index score of adjacent users.

Figure 5:
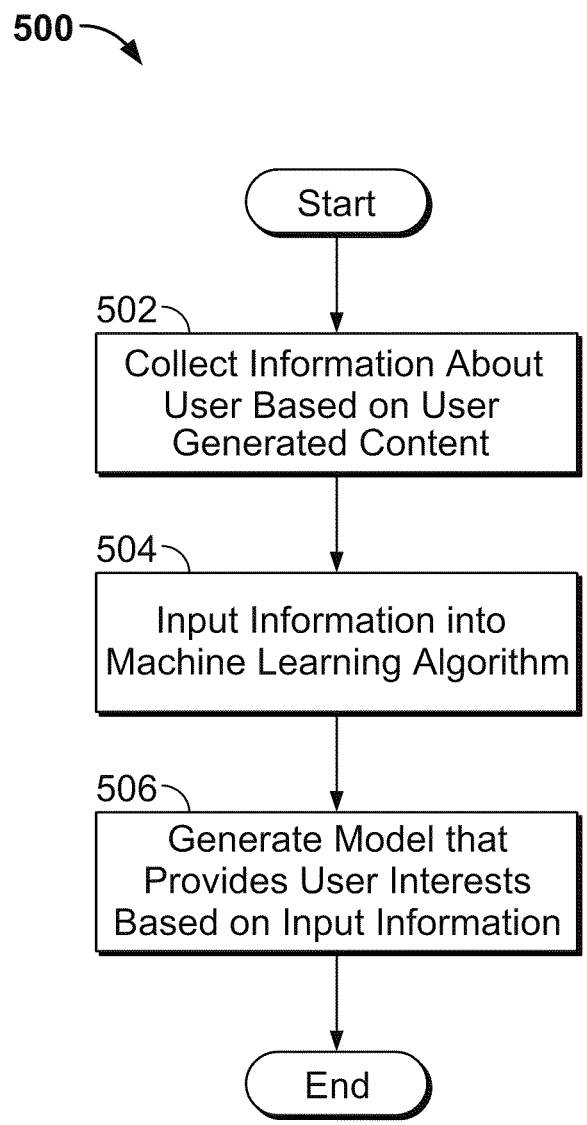
FIG. 5 is a flow chart of example process, respectively, for generating a model of a user's interests from user generated content.

FIG. 5 is a flow chart of example process 500, respectively, for generating a model of a user's interests from user generated content. The processes 500 may be performed, for example, by a system such as the systems 100 and 200 and, for clarity of presentation, the description that follows uses the systems 100 and 200 as the basis of an example for describing the processes. However, another system, or combination of systems, may be used to perform the process 500.

Process 500 may begin at step 502 by collecting information about a user based on user generated content. The information collected may be demographic information (e.g., age, gender, geographic location, etc.) and/or may pertain to a user's interests (e.g., sports, music, etc.). User generated content can include any content generated by a user of a social network, such as information a user provides on his/her own profile page (e.g., interests, age, gender, etc.), groups a user joins (e.g., a hiking club group), and/or comments a user posts (e.g., status updates, comments posted on another user's profile page).

In some instances, visual and audio media (e.g., music, photos, videos) posted by a user may also be collected. Meta-tags associated with the visual and audio content may be collected. In some instances, an audio/video content analyzer may be used to derive information regarding the visual and audio content. For example, an audio/visual analyzer may identify an audio file by comparing a calculated file signature for the audio file against a database of known audio files. In another example, an audio/visual analyzer may attempt to tease-out information regarding the content of a photo by searching for items and/or logos in the photo that may be associated with a particular topic (e.g., finding baseball hats, baseball gloves, and/or baseball team logos in an image may indicate the photo relates to baseball.

At step 504, process 500 can input the collected information into a machine learning algorithm. The machine learning algorithm may be a latent topic modeling algorithm. A latent topic modeling algorithm may examine the collected information and, based upon the topics that are presented, generate a list of topics that are pertinent to a user. In some implementations, the algorithm may check the collected information against a database of keywords that are associated with topics. These keywords and associated topics may be dynamically learned and adjusted by the algorithm.

At step 506, process 500 may generate a topic model that provides a user's interests based upon the collected information. A topic model for a user may provide a list of attributes associated with a user's interests. A topic model may provide an indication of how interested a user is in a particular topic (e.g., a user is most interested in sports and then music). After a topic model is generated, process 500 may end.

In generating a topic model, previous topic models may also be examined in order to determine changes in a user's interests over time. For instance, a topic model may provide that a user has recently become interested in genealogy and that the user's interest in sports has been declining over the past year.

For example, a user U10 may have a profile page with blog entries regarding soccer and skiing and photos from a recent professional soccer match the user attended. The user U10 may also be a member of a video game group on the social network and may post comments on profile pages of other users regarding soccer, movies, and snow conditions at ski areas. All of this information would be collected by process 500 and input into a machine learning algorithm. Using the machine learning algorithm, process 500 may then generate a topic model for user U10. The topic model may list the following interests in order from a greatest amount of interest to a least amount of interest: soccer, skiing, movies, and video games. By examining previous topic models for user U10, the topic model may also provide that soccer has consistently been the user U10's greatest interest, that skiing is a cyclical interest that peaks in winter, and that movies and video games has decreased over the past year.

Figure 6:
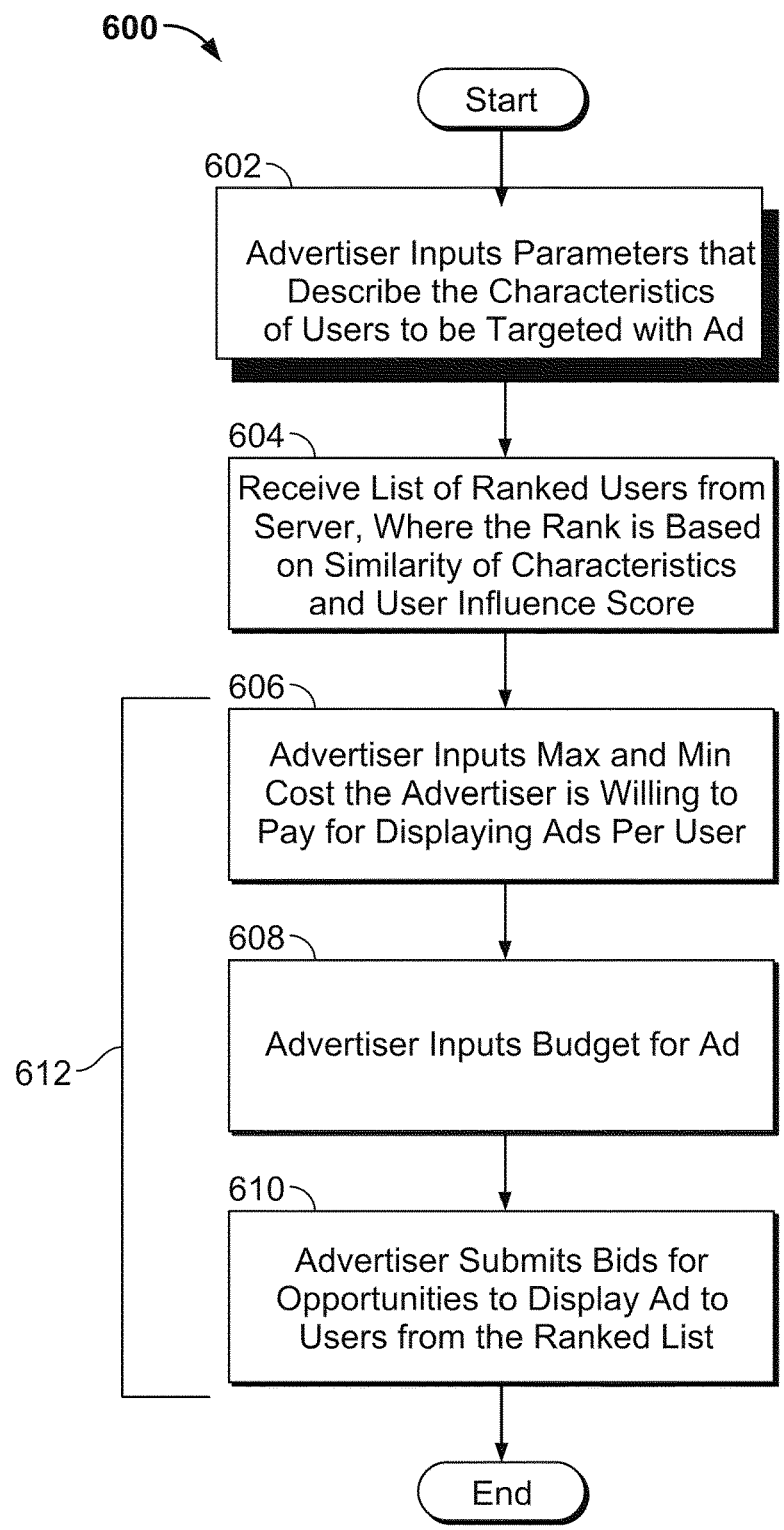
FIG. 6 is a flow chart of example process, respectively, for an advertiser to place bids for opportunities to display ads to users of a social network.

FIG. 6 is a flow chart of example process 600, respectively, for an advertiser to place bids for opportunities to display ads to users of a social network. The processes 600 may be performed, for example, by a system such as the systems 100 and 200 and, for clarity of presentation, the description that follows uses the systems 100 and 200 as the basis of an example for describing the processes. However, another system, or combination of systems, may be used to perform the process 600.

Process 600 may begin at step 602 by an advertiser inputting parameters that describe the characteristics of users the advertiser desires to target with an ad. Characteristics can include demographic information (e.g., age, gender, geographic location) and/or interests (e.g., sports, music). The advertiser may input this information through an interface on a client side, such as the Adheat interface 210 of system 200, which may in-turn be submitted to a server side, such as the web server 214 of system 200.

At step 604, process 600 receives a list of ranked users from a server, where the rank is based on a similarity of the characteristics and user influence score. The ranked list of users may be generated on a server, such as web server 214, in a manner similar to that described above with regard to FIGS. 1-3. The ranked list of users may be received though an interface, such as the Adheat interface 210 of system 200.

For example, an advertiser A1 may input parameters for users to be targeted with its ad such as males, between the ages of 18 and 35, who are interested in sports. The advertiser A1 may then receive a list of ranked users U1-U5. The user U1, ranked at the top of the list, may most closely match the characteristics submitted by the advertiser A1 and may also have a high influence score on a social network. The user U5, ranked at the bottom of the list, may least match the characteristics submitted by the advertiser A1 and/or may have a low influence score on the social network.

At step 606, the advertiser may input a maximum and minimum cost the advertiser is willing to pay for displaying ads per user. In some instances, the advertiser may input a maximum and a minimum cost the advertiser is willing to pay for displaying ads to a block or group of users. The maximum and minimum cost may be input though an interface, such as the Adheat interface 210 of system 200.

Using the previous example, a maximum and minimum cost for users U1-U5 that the advertiser A1 may be willing to pay may be directly correlated to the rank of each user on the list received at step 604. The advertiser A1 may input a maximum and minim cost for user U1 as $1.00 and $0.50, respectively. However, the advertiser A1 may input a maximum and minim cost of only $0.25 and $0.05, respectively, for user U5. In some instances, the advertiser A1 may not input a bid for lower ranked users, such as user U5.

At step 608, the advertiser inputs an overall budget for displaying an ad. An overall budget may be the maximum amount the advertiser is willing to spend for the ad to be displayed to the bid upon users and to be propagated to other users of a social network. Once the budget is exhausted, the ad may stop being displayed to users of a social network. The overall budget may be input though an interface, such as the Adheat interface 210 of system 200.

In some instances, the budget may be for a periodic or specified time period. For example, an advertiser may provide that a daily budget for displaying the ad is $50.00. Once the daily budget is exhausted, the ad may not be displayed to users of the social network until the next daily period begins.

At step 610, the advertiser may submit its bids (e.g., maximum and minimum costs) for opportunities to display an ad to users from the ranked list. Along with the bids, the advertiser may submit the overall budget for the ad as well. The bids may be submitted by the advertiser through an interface, such as the Adheat interface 210 of system 200, and received by a component on a server side, such as the web server 214. After the advertiser submits its bid, the process 600 may end.

Steps 606-610 may collectively represent a bidding process 612 performed by an advertiser for opportunities to display an ad to users of a social network. The bidding process 612 may be performed periodically by an advertiser for a particular ad (e.g., monthly). In some instances, the bidding process 612 may be automated for an advertiser based upon the advertiser's previous bids for similar ads. For example, if an advertiser has provided average maximum and minimum bids for a first and fifth ranked user of $1.00-$0.50 and $0.25-$0.05, respectively, the bidding process 612 may automatically use these average values for a first and fifth ranked user as part of a new bid.

In some instances, the automatic bid amount may be based, at least in part, on a user's influence score and rank in the list of ranked users. For example, an automatic bid amount may be based upon an amount bid per user influence score over user rank (e.g., amount bid/(user influence score/user rank)). Since the user influence score and the user rank may be provided to an advertiser at step 604, an amount bid may be automatically calculated for each user on the ranked list. In some instances, a threshold value for a calculated amount bid (e.g., amount bid greater than $0.01), a user influence score (e.g., score greater than average influence score), and/or a user rank (e.g., rank within the top 25) may need to be met in order for an automatic bid to be placed for a user.

Figure 7:
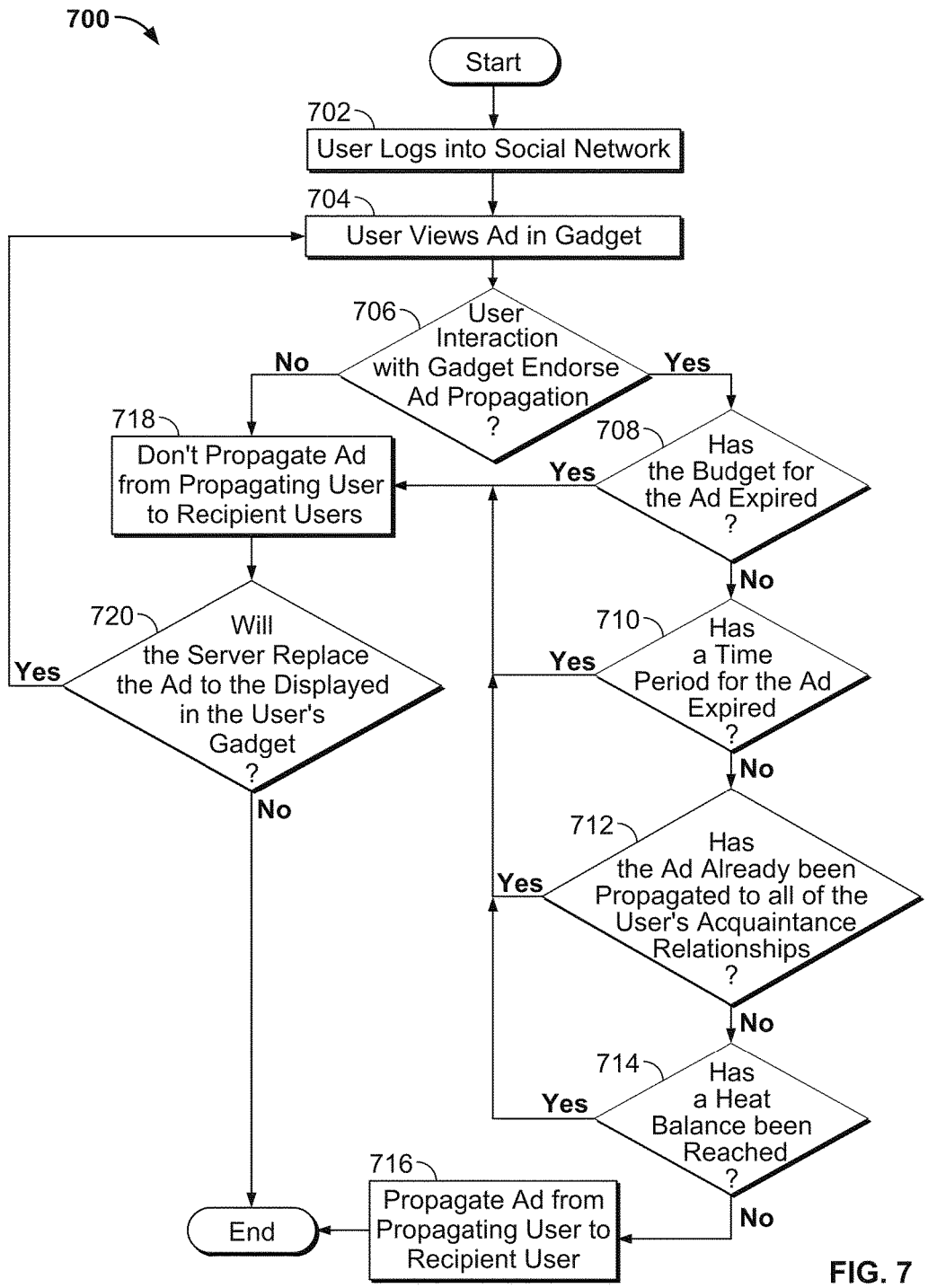
FIG. 7 is a flow chart of example process, respectively, for propagating an ad from a propagating user to a recipient user.

FIG. 7 is a flow chart of example process 700, respectively, for propagating an ad from a propagating user to a recipient user. The processes 700 may be performed, for example, by a system such as the systems 100 and 200 and, for clarity of presentation, the description that follows uses the systems 100 and 200 as the basis of an example for describing the processes. However, another system, or combination of systems, may be used to perform the process 700.

Process 700 may begin at step 702 by a user of a social network logging into the social network. At step 704, the user may view an ad in a gadget. A gadget may be an interactive interface embedded within the user's view of the social network, such as the gadget 212 described with reference to system 200. For example, the gadget may be an interactive widget that is displayed in the user's web page based view of the social network. The gadget may display an ad which an advertiser won an opportunity to display to the user. The gadget may also display ads propagated to the user from another user on the social network.

At step 706, the process 700 may determine whether the user has interacted with the ad being displayed in the gadget. User interaction may include clicking on the ad, providing an indication of attention to the ad (e.g., pressing a "play" button for a video ad), and/or deciding to propagate the ad to other users of the social network. If the user interacts with the ad displayed in the gadget, then process 700 proceeds to step 708. If the user does not interact with the ad displayed in the gadget, then process 700 does not propagate the ad at step 718.

In some implementations, at step 706, the process 700 may further determine whether the user's interaction endorses propagation of the ad to other users of the social network (e.g., propagation to users connected to the user by an acquaintance relationship). For example, for ad propagation to occur, a user may have to indicate it consents to propagation through some sort of interaction with the gadget (e.g., clicking a "Propagate ad" button). If the user indicates consent to propagation, then process 700 may proceed to step 708. Even though a user may interact with the ad, if the user does not endorse propagation of the ad, then process 700 does not propagate the ad at step 718.

At step 708, process 700 determines whether the budget for the ad has expired. As described with reference to process 600, an advertiser may provide an overall budget for displaying an ad. Once the budget has been used-up by displaying the ad to users of a social network, the ad may not be propagated. If the budget has not been exhausted, then process 700 proceeds to step 710. If the budget has been exhausted, the process 700 does not propagate the ad at step 718.

At step 710, process 700 determines whether a time period for displaying the ad has expired. An advertiser may specify that an ad is to be displayed within a specific period of time. For example, regarding an ad for a music concert, the advertiser may specify that the ad should be shown up to the time of the concert, but not afterward. If the time period for displaying the ad has not expired, then process 700 proceeds to step 712. If the time period for displaying the ad has expired, then process 700 does not propagate the ad at step 718.

At step 714, process 700 determines whether the ad has already been propagated to all of the users connected to the user by an acquaintance relationship. As described above, an acquaintance relationship can be a connection among two users of a social network, such as a friendship relationship, posting a comment on another user's profile page, viewing another user's profile page, interacting with another user in an social network facilitated activity (e.g., playing an online game together through the social network, conversing via a chat room or discussion thread), and/or belonging to similar social group or organization on the social network. If the ad has not been propagated to at least one of the users connected to the user by an acquaintance relationship, then process 700 proceeds to step 714. If the ad has already been propagated to all of the users connected to the user by an acquaintance relationship, then process 700 does not propagate the ad at step 718.

At step 714, process 700 determines whether a heat diffusion balance has been reached between the user and users connected to it by an acquaintance relationship to whom the ad has not already been propagated. As described above with reference to step 408 of process 400, an ad may propagate from one user to another as long as a heat diffusion balance has not yet been reached. A heat diffusion balance may be reached when an influence score for a propagating user is less than or equal to an influence score for a recipient user. If a heat diffusion balance has been not been reached for at least one user connected to the user by an acquaintance relationship, then the process 700 proceeds to step 716. If a heat diffusion balance has been reached for all users connected to the user by an acquaintance relationship, then process 700 does not propagate the ad at step 718.

At step 716, process 700 propagates the ad from the user (e.g., the propagating user) to a recipient user (e.g., a user connected to the propagating user by an acquaintance relationship). Recipient users may be users that are connected to the propagating user by an acquaintance relationship, that have an influence score less than the influence score of the propagating user, and to whom the ad has not yet been propagated. In some implementations, the ad may be propagated to all recipient users. In other implementations, the ad may be propagated to only recipient users meeting a criterion set by the advertiser. For example, the advertiser may indicate that propagation to a recipient user should occur only if the recipient user has an influence score that is greater than 80% of the influence score of the propagating user. After propagating an ad to a recipient user, process 700 may end.

At step 718, process 700 does not propagate the ad from the user to users connected to it by an acquaintance relationship. After step 718, process 700 proceeds to step 720. At step 720, process 700 determines whether there is replacement ad available to be displayed to the user in the gadget. A replacement ad may be another ad that can be displayed to the user (e.g., an advertiser won an opportunity to display the replacement ad to the user, an ad has been propagated to the user). If a replacement ad is available to be displayed to the user, then process 700 may return to step 704 and may display the replacement ad to the user in the gadget. If a replacement ad is not available, then process 700 may end.

Figure 8:
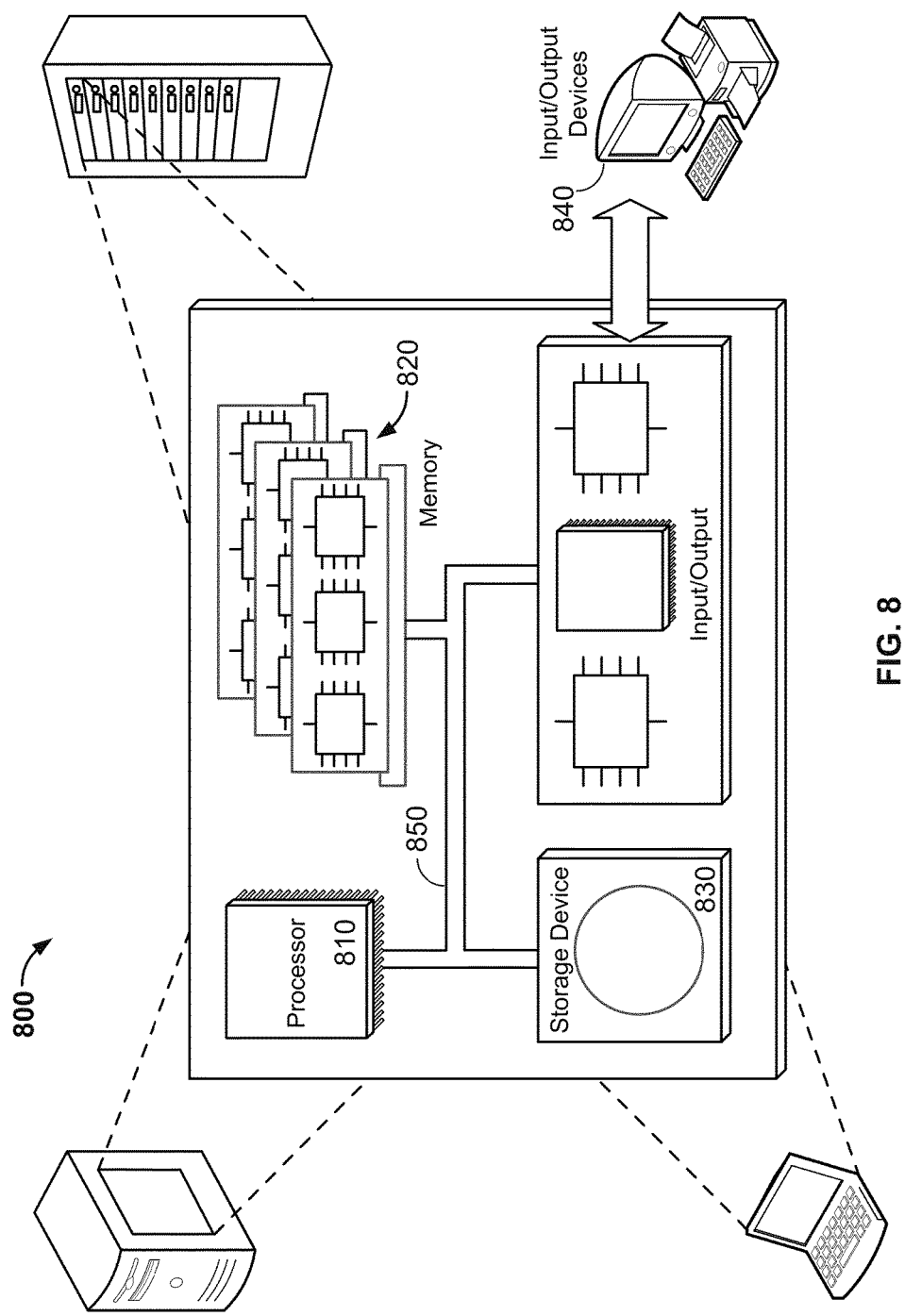
FIG. 8 is a schematic diagram of a computer system.

FIG. 8 is a schematic diagram of a computer system 800. The system 800 can be used for the operations described in association with any of the computer-implement methods described previously, according to one implementation. The system 800 is intended to include various forms of digital computers, such as laptops, desktops, workstations, personal digital assistants, servers, blade servers, mainframes, and other appropriate computers. The system 800 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. Moreover, other mechanisms for providing advertisements to users of a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving, at a first time, at a server a request from an advertiser to target an ad for display by a computer-implemented social network to users of the computer-implemented social network, the request comprising data representing characteristics of the users that the advertiser desires to target;
   ranking, by the server and in response to receiving the request to target an ad to users, the users based on i) how similar the users' characteristics are to the received characteristics and ii) an influence score for each user that indicates how influential the user is within the computer-implemented social network;
   determining, by the server and in response to the ranking of the users, a score for the advertiser's request based on at least i) a bid price from the advertiser for an opportunity to display the ad to one or more of the users targeted by the advertiser and ii) a determined level of quality for the ad that indicates how likely the ad is to be selected when the ad is presented to the one or more users;
   assigning, by the server and to the advertiser, the opportunity to display the ad to a plurality of users, each of the plurality of users targeted by the advertiser based on a correlation between the score of the advertiser's request and one or more rankings of each of the plurality of the one or more users;
   receiving, at a second time that is after the first time and from a computing device that is associated with a first user, a request for content of the social network;
   determining, in response to receiving the request, that the first user is one of the plurality of users who have been assigned the opportunity to display the ad;
   outputting, by the server to the computing device associated with the first user and in response to determining that the first user is one of the plurality of users, the requested content of the social network and the ad for presentation in an application that is installed on the computing device;

identifying, by the application that is installed on the computing device, the first user as a propagating user; and recursively propagating the ad, by the application that is installed on the computing device, including:

identifying multiple related users that are each connected to the propagating user in the social network;

identifying an influence score of the propagating user;

for each given related user of the related users:

identifying an influence score of the given related user, wherein at least some of the related users have a higher or equal influence score as compared to the propagating user and at least some of the related users have a lower influence score than the propagating user;

determining whether the influence score of the given related user is less than the influence score of the propagating user;

propagating the ad to the given related user in response to determining that the influence score of the given related user is less than the influence score of the propagating user;

providing a substitute ad to the given related user in response to determining that the influence score of the given related user is not less than the influence score of the propagating user;

determining whether an end condition has been met; and stopping the recursive propagation of the ad in response to determining that the end condition has been met.

2. The method of claim 1, further comprising generating by the server the influence score for a user based on the user's level of activity on the computer-implemented social network.

3. The method of claim 2, further comprising determining by the server the level of activity of the user based on a quality or type of content generated by the user on the computer-implemented social network; a quality or type of interactions with other users on the computer-implemented social network; or frequency of user interaction within the computer-implemented social network over a period of time.

4. The method of claim 2, further comprising determining by the server the level of activity of the user based on an quality of content generated by the user on the computer-implemented social network or a quality of interactions with other users on the computer-implemented social network.

5. The method of claim 3, wherein the influence score for a user indicates greater influence when the content generated by the user or the interactions with other users are determined to be substantive, wherein substantive content comprises original content that is greater than a threshold amount of content.

6. The method of claim 1, further comprising generating by the server the influence score for a user based on the user's acquaintance relationships on the computer-implemented social network, wherein an acquaintance relationship comprises a bi-directional relation between two users of the social network.

7. The method of claim 6, wherein a user with a greater number of acquaintance relationships has an influence score indicating greater influence than a user with a smaller number of acquaintance relationships.

8. The method of claim 6, wherein the user's influence score is based on influence scores of other users who have acquaintance relationships with the user.

9. The method of claim 6, wherein the user's influence score is based on a significance of a type of the user's acquaintance relationships.

10. The method of claim 9, wherein the computer-implemented social network is at least partially represented using a graph comprising user nodes connected by acquaintance relationships, and wherein a first type of acquaintance relationship that connects a sub-graph portion of the graph to the rest of the graph has a greater significance than a second type of acquaintance relationship that does not connect a sub-graph portion of the graph to the rest of the graph.

11. The method of claim 1, wherein the data representing characteristics of the users relate to an age, a gender, keywords describing interests, or a geographic location.

12. The method of claim 1, further comprising transmitting by the server a list of the ranked of users to the advertiser.

13. The method of claim 1, wherein the bid from the advertiser includes a minimum bid per user, a maximum bid per user, or a total budget for the ad.

14. The method of claim 1, further comprising applying by the server a weighting preference comprising a first weight indicating how much significance to assign to the similarity between the user's characteristics and the received characteristics in the ranking of users and a second weight indicating how much significance to assign to the influence score in the ranking of users.

15. The method of claim 14, wherein ranking the users further comprises calculating a first weighted value by applying the first weight to the similarity to the received characteristics for each user, calculating a second weighted value by applying the second weight to the influence score for each user, and combining the first weighted value with the second weighted value.

16. The method of claim 14, wherein the weighting preference is a preference provided by the advertiser.

17. The method of claim 14, wherein the weighting preference is predetermined.

18. The method of claim 14, further comprising calculating by the server a weighting preference based upon a content of the ad, weighting preferences for previous ads with similar content, or an effectiveness of the previous ads.

19. The method of claim 1, wherein the determined level of quality for the ad comprises a click-through rate for the ad.

20. The method of claim 1 further comprising:

receiving, at a third time after the first time and from a second user, a request to display content of the social network;

determining that the second user is not of the plurality of users; and outputting, by the server to the second user in response to determining that the second user is not one of the plurality of users, a display of the content of the social network, the display including a default ad that is different than the ad.

21. The method of claim 1, further comprising:

in response to determining that the end condition has not been met:

identifying the given related user as a new propagating user; and performing a new recursive propagation of the ad using the new propagating user.

22. A system for assigning an opportunity to display an ad to users of a social network, comprising:

one or more servers including one or more processor and one or more memory modules, the one or more processors configured to generate;
  an interface that is programmed to receive, at a first time, from an advertiser a request to target an ad for display by a computer-implemented social network to users of the computer-implemented social network, the request comprising data representing characteristics of the users that the advertiser desires to target;
  means for ranking, in response to receiving the request to target an ad to users, the users based on i) how similar the users' characteristics are to the received characteristics and ii) an influence score for each user that indicates how influential the user is within the computer-implemented social network;
  a request scoring module that is programmed to determine a score for the advertiser's request in response to the ranking of the users based on at least i) a bid price from the advertiser for an opportunity to display the ad to one or more of the users targeted by the advertiser and ii) a determined level of quality for the ad that indicates how likely the ad is to be selected when the ad is presented to the one or more users; and
  an ad assignment module that is programmed to:
    assign to the advertiser the opportunity to display the ad a plurality of users, each of the plurality of users targeted by the advertiser based on a correlation between the score of the advertiser's request and one or more rankings of each of the plurality of the one or more users,
    receive, at a second time that is after the first time and from a computing device that is associated with a first user, a request for content of the social network;
    determining, in response to receiving the request, that the first user is one of the plurality of users who have been assigned the opportunity to display the ad;
    output, to the computing device associated with the first user and in response to determining that the first user is one of the plurality of users, the requested content of the social network and the ad for presentation in an application that is installed on the computing device;
    identify, by the application that is installed on the computing device, the first user as a propagating user; and
    recursively propagate the ad, by the application that is installed on the computing device, including:
      identifying multiple related users that are each connected to the propagating user in the social network;
      identifying an influence score of the propagating user;
      for each given related user of the related users:
        identifying an influence score of the given related user, wherein at least some of the related users have a higher or equal influence score as compared to the propagating user and at least some of the related users have a lower influence score than the propagating user;
        determining whether the influence score of the given related user is less than the influence score of the propagating user;
        propagating the ad to the given related user in response to determining that the influence score of the given related user is less than the influence score of the propagating user;
        providing a substitute ad to the given related user in response to determining that the influence score of the given related user is not less than the influence score of the propagating user;
      determining whether an end condition has been met; and
      stopping the recursive propagation of the ad in response to determining that the end condition has been met.

23. The system of claim 22, wherein the means for ranking the users generates the influence score for a user based on the user's level of activity on a social network.

24. The system of claim 22, wherein the means for ranking the users generates the influence score for a user based on the user's acquaintance relationships on the social network.

25. The system of claim 22, wherein the data representing characteristics of the users relate to an age, a gender, interests, or a geographic location of users on a social network.

26. A computer-implemented method comprising:
  receiving, at a first time at a server, information related to a content of an ad from an advertiser;
  creating, by the server and in response to receiving the information related to a content of an ad, an ordered list of users of a computer-implemented social network based on a likelihood a user will be receptive to the content of the ad and an amount of influence a user has over other users of the computer-implemented social network;
  receiving at the server a bid from the advertiser for a right to display the ad to a plurality of users provided in the ordered list of users;
  awarding by the server the right to display the ad to the plurality of users to the advertiser if a score for the ad is greater than other scores for ads received within a time period from other advertisers for the right to display the ad to the plurality of users, wherein the bid from the advertiser is received within the time period and wherein the score is based on at least i) a bid price and ii) a determined level of quality for the ad that indicates how likely the ad is to be selected when the ad is presented to the one or more users;
  receiving, at a second time that is after the first time and from a computing device that is associated with a first user, a request for content of the social network;
  determining, in response to receiving the request, that the first user is one of the plurality of users who have been assigned the opportunity to display the ad;
  outputting, by the server, the ad for display in an application that is installed on a client associated with the user;
  identifying, by the application that is installed on the computing device, the user as a propagating user; and
  recursively propagating the ad, by the application that is installed on the computing device, including:
    identifying multiple related users that are each connected to the propagating user in the social network;
    identifying an influence score of the propagating user;
    for each given related user of the related users:
      identifying an influence score of the given related user, wherein at least some of the related users have a higher or equal influence score as compared to the propagating user and at least some of the related users have a lower influence score than the propagating user;

determining whether the influence score of the given related user is less than the influence score of the propagating user;

propagating the ad to the given related user in response to determining that the influence score of the given related user is less than the influence score of the propagating user;

providing a substitute ad to the given related user in response to determining that the influence score of the given related user is not less than the influence score of the propagating user;

determining whether an end condition has been met; and stopping the recursive propagation of the ad in response to determining that the end condition has been met.

27. The method of claim 26, further comprising determining by the server a likelihood a user of the computer-implemented social network will be receptive to the content of the ad by comparing the content of the ad to information related to interests of the user.

28. The method of claim 26, further comprising determining by the server an amount of influence a user has over other users of the computer-implemented social network by assessing the user's relationships with the other users of the computer-implemented social network and the user's level of activity on the social network.

* * * * *